(12) United States Patent
Xu et al.

(10) Patent No.: US 9,864,683 B1
(45) Date of Patent: Jan. 9, 2018

(54) MANAGING CACHE FOR IMPROVED DATA AVAILABILITY BY ASSOCIATING CACHE PAGES WITH RESPECTIVE DATA OBJECTS

(71) Applicant: EMC Corporation, Hopkinton, MA (US)

(72) Inventors: Xinlei Xu, Beijing (CN); Yongjun Wu, Beijing (CN); Thomas E. Linnell, Northborough, MA (US); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 47 days.

(21) Appl. No.: 14/501,939

(22) Filed: Sep. 30, 2014

(51) Int. Cl.
*G06F 12/08* (2016.01)
*G06F 3/06* (2006.01)
*G06F 12/02* (2006.01)
*G06F 12/0808* (2016.01)

(52) U.S. Cl.
CPC ........ *G06F 12/0808* (2013.01); *G06F 3/0619* (2013.01); *G06F 3/0665* (2013.01); *G06F 3/0689* (2013.01); *G06F 12/0246* (2013.01); *G06F 2212/1032* (2013.01); *G06F 2212/262* (2013.01); *G06F 2212/285* (2013.01); *G06F 2212/7209* (2013.01)

(58) Field of Classification Search
CPC ............. G06F 8/454; G06F 2212/1032; G06F 12/0815
See application file for complete search history.

(56) References Cited

U.S. PATENT DOCUMENTS

| | | | |
|---|---|---|---|
| 6,243,827 B1 * | 6/2001 | Renner, Jr. ............ | G06F 11/004 714/6.12 |
| 6,425,051 B1 * | 7/2002 | Burton .................. | G06F 3/0605 703/23 |
| 6,513,097 B1 * | 1/2003 | Beardsley ........... | G06F 11/0724 711/113 |
| 6,553,387 B1 * | 4/2003 | Cabrera ............ | G06F 17/30371 |
| 8,583,865 B1 | 11/2013 | Sade et al. | |
| 8,694,724 B1 | 4/2014 | Linnell et al. | |
| 8,832,363 B1 * | 9/2014 | Sundaram ............. | G06F 11/108 711/103 |
| 8,904,061 B1 | 12/2014 | O'Brien, III et al. | |
| 9,043,533 B1 | 5/2015 | Shajenko, Jr. et al. | |
| 2010/0161919 A1 * | 6/2010 | Dodgson ............. | G06F 11/1458 711/161 |
| 2013/0086330 A1 * | 4/2013 | Baddepudi .......... | G06F 12/0868 711/143 |

OTHER PUBLICATIONS

EMC VNX® Fast Cache, VNX 5100, VNX5300, VNX5700, & VNX7500, A Detailed Review, White Paper, Dec. 2013, 25 pages.
EMC VNX Unified Best Practices for Performance, Applied Best Practices Guide, VNX OE for Block 5.33 and VNX OE for File 8.1, Mar. 2014, 35 pages.

* cited by examiner

*Primary Examiner* — Ann J Lo
*Assistant Examiner* — Michelle Taeuber
(74) *Attorney, Agent, or Firm* — BainwoodHuang (57) ABSTRACT

A technique for managing a cache in a data storage system includes creating metadata that associates cache pages with respective data objects and storing the metadata in a location accessible to a manager of the cache. Upon a failure in the cache, the cache manager checks the metadata to identify any data objects for which the cache stores dirty pages. The cache manager then coordinates with other system resources to take the identified data objects offline.

23 Claims, 6 Drawing Sheets

MANAGING CACHE FOR IMPROVED DATA AVAILABILITY BY ASSOCIATING CACHE PAGES WITH RESPECTIVE DATA OBJECTS

BACKGROUND

Data storage systems are arrangements of hardware and software that may include multiple storage processors coupled to arrays of non-volatile storage devices. In typical operation, the storage processors service storage requests that arrive from users. The storage requests specify files or other data elements to be written, read, created, or deleted, for example. The storage processors run software that manages incoming storage requests and performs data processing tasks to organize and secure user data stored on the non-volatile storage devices.

Some data storage systems provide caches composed from high-speed, non-volatile storage devices, such as flash drives. These data storage systems use such caches to store frequently accessed data backed by magnetic disk or other storage media. By providing frequently accessed data on such caches, the data storage systems are able to respond more quickly to storage requests than they could if it were always necessary to access frequently used data from magnetic disk.

SUMMARY

Unfortunately, failures in high-speed caches used by data storage systems can have far-reaching effects that impair data availability. For example, some data storage systems provision storage to user-accessible data objects from internal volumes. To prevent hot spots and promote load balancing, such data storage systems generally provision extents of storage from each internal volume across many different data objects. A cache manager of the high-speed cache stores metadata for tracking the internal volume associated with each cache page, as well as a clean/dirty state of all cache pages backed by each internal volume. In the event of a cache failure, the cache manager reads the metadata and identifies each internal volume for which the cache has at least one dirty page. A cache page being dirty means that the cache stores the most recent copy of data, e.g., the data in the dirty page have not yet been synced back to magnetic disk. But if the cache is broken, the data storage system cannot access the most recent data from the cache. To avoid data corruption or other confusion, the cache manager coordinates with other system resources to disable each internal volume that has at least one dirty cache page in the broken cache.

Disabling each internal volume with a dirty cache page can have far-reaching effects. Because data storage systems aim to provision storage extents from each internal volume to many different data objects to avoid hot spots, the act of disabling a single internal volume can have a multiplier effect that renders a large number of data objects unavailable. What is needed is a way of reducing the scope of data objects made unavailable by a cache failure to promote overall system availability.

In contrast with conventional approaches to cache management, an improved technique for managing a cache in a data storage system includes creating metadata that associates cache pages with respective data objects and storing the metadata in a location accessible to a manager of the cache. Upon a failure in the cache, the cache manager checks the metadata to identify any data objects for which the cache stores dirty pages. The cache manager then coordinates with other system resources to take the identified data objects offline. The scope of data objects taken offline is thus reduced from all data objects backed by an internal volume to only those data objects that have dirty pages in the failed cache. Data availability is greatly improved, with fewer users affected by a cache failure and with those users who are affected being affected to a lesser degree.

Certain embodiments are directed to a method of managing a cache in a data storage system. The method includes creating metadata by a cache manager operating in the data storage system. The metadata associates multiple data objects hosted by the data storage system with respective ranges of cache pages and with respective clean/dirty cache state information. The cache pages are arranged to cache data of the data objects, and the data objects each composed from respective extents of storage provisioned from a set of internal volumes of the data storage system. The method further includes, upon a failure of the cache, accessing the metadata by the cache manager to identify a set of the data objects that the metadata has associated with dirty cache and taking offline each of the identified set of data objects.

Other embodiments are directed to a data storage system constructed and arranged to perform a method of managing a cache, such as that described above. Still other embodiments are directed to a computer program product. The computer program product stores instructions, which when executed on one or more processing units of a data storage system, cause the data storage system to perform a method of managing a cache, such as that described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing a cache in a data storage system includes creating metadata that associates cache pages with respective data objects and storing the metadata in a location accessible to a manager of the cache. Upon a failure in the cache, the cache manager checks the metadata to identify any data objects for which the cache stores dirty pages. The cache manager then coordinates with other system resources to take the identified data objects offline. Data availability is greatly improved as compared with prior solutions.

Figure 1:
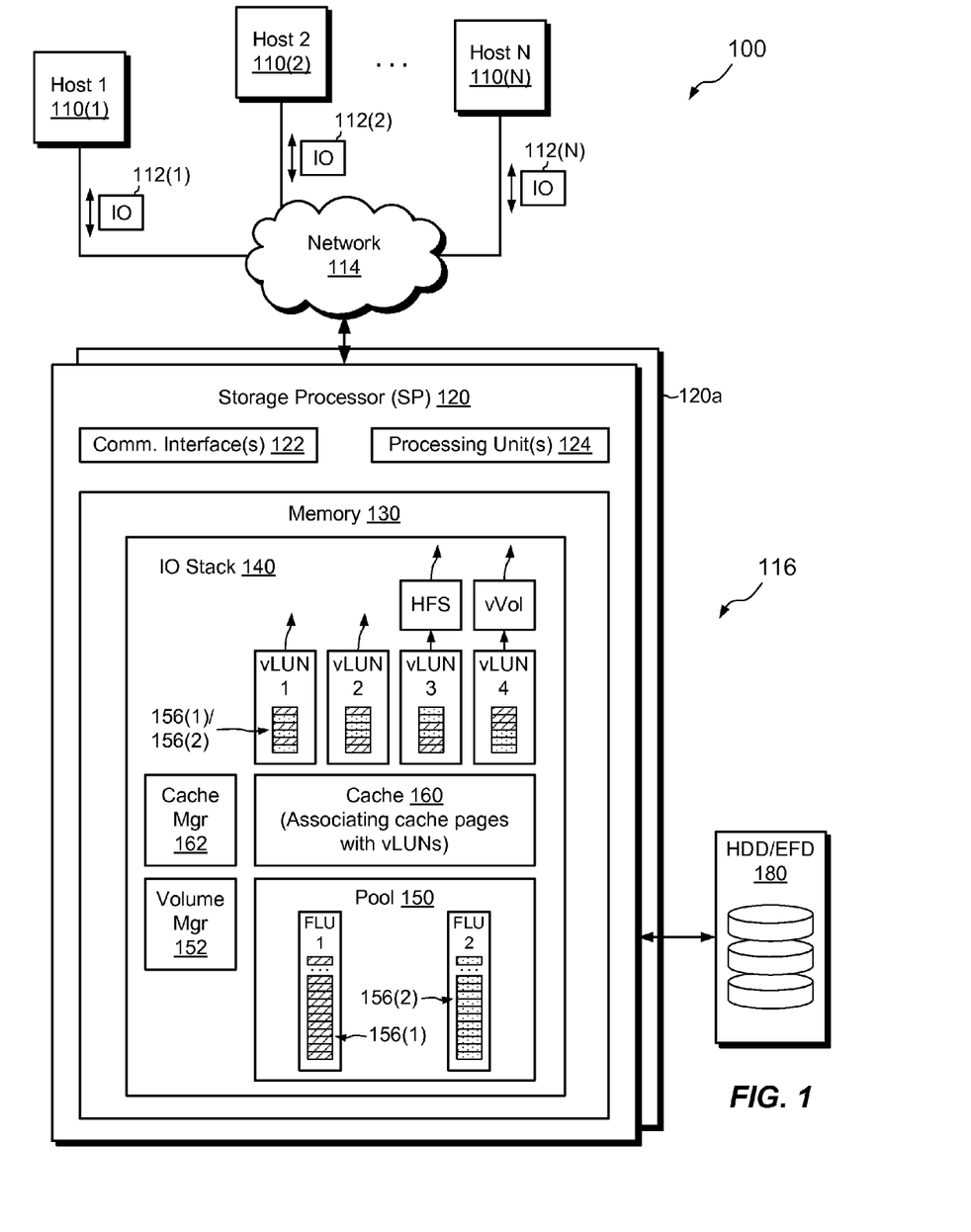
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and electronic flash drives, and may also include optical drives and other storage media. The data storage system 116 may include multiple SPs like the SP 120 (see, for example, a second SP 120a). For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies, such as Fibre Channel, InfiniBand, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180.

The SP 120 is seen to include one or more communication interfaces 122, a set of processing units 124, and memory 130. The communication interfaces 122 include, for example, adapters such as SCSI target adapters and network interface adapters for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM) and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, as well as various applications, processes, and daemons.

The memory 130 is seen to include an IO stack 140. The IO stack 140 provides an execution path for host IOs (e.g., IO requests 112(1-N)). Here, the IO stack 140 is seen to include a storage pool 150, a volume manager 152, a cache 160, and a cache manager 162.

The storage pool 150 organizes portions of the storage 180 into internal volumes, depicted here as Flare LUNs (FLUs) FLU1 and FLU2. Each FLU (Flare Logical Unit) provides a volume-based interface for a respective RAID group supporting the FLU. RAID is an acronym for "Redundant Array of Independent Disks." In an example, each FLU is backed by a RAID group consisting of multiple magnetic disk drives in the storage 180. Although the storage pool 150 is shown to include two internal volumes (FLU1 and FLU2), it is understood that any number of internal volumes may be provided. Also, Flare LUNs are merely one suitable example of internal volumes. Other configurations of internal volumes may be used besides Flare LUNs, including configurations not backed by RAID groups and configurations that user storage media other than magnetic disks.

Each of the internal volumes FLU1 and FLU2 includes multiple storage extents, shown as extents 156(1) and 156(2), respectively, which the storage pool 150 may provision to data objects to satisfy their storage requirements. Each "extent" includes a logical range of storage blocks, where each block is an allocation unit of storage (e.g., an 8K allocation unit). In an example, the storage pool 150 provisions the storage extents 156(1) and 156(2) in the form of "slices," where each slice is a stripe across a RAID group and has a uniform size, such as 256 MB or 1 GB, for example. It should be understood, however, that the storage pool 150 may provision storage extents in any form, including forms not based on RAID groups and/or forms that are not uniform in size.

In an example, the volume manager 152 manages the storage pool 150 and provisions storage extents 156(1) and 156(2) from the storage pool 150 to virtual LUNs (Logical Unit Numbers), such as vLUN1, vLUN2, vLUN3, and vLUN4. In an example, the virtual LUNs are thinly provisioned data objects and the volume manager 152 provisions storage extents to the virtual LUNs on demand, as their needs for storage space increase. In some examples, the volume manager 152 provisions storage extents 156(1) and 156(2) to the virtual LUNs in a manner that tends to distribute storage extents from each internal volume across different virtual LUNs, so as to prevent hot spots. Thus, the storage extents that compose each virtual LUN are generally derived from multiple internal volumes.

The data storage system 116 may export some of the virtual LUNs directly as data objects to hosts 110(1) to 110(N), e.g., as shown for vLUN1 and vLUN2. Hosts may then access these virtual LUNs for reading and/or writing using a block-based protocol, such as Fibre Channel or iSCSI, for example.

The data storage system 116 may employ other virtual LUNs to support other types of data objects, such as host file systems and virtual volumes (vVols), for example, which the data storage system 116 may export to hosts 110(1) to 110(N). Hosts may access host file systems and virtual volumes using suitable file-based and/or block-based protocols. In the example shown, host file system "HFS" is built upon vLUN3, and virtual volume "vVol" is built upon vLUN4. Virtual volumes (vVols) are available, for example, from VMWare Corporation of Palo Alto, Calif., and may be provided in both block-based and file-based forms. The IO stack 140 internally converts IO requests directed to host file systems and vVols to respective block-based (volume) requests directed to their underlying virtual LUNs.

In some examples, the virtual LUNs themselves are built upon respective files hosted from one or more container file systems operated within the IO stack 140. Additional information about container file systems may be found in copending U.S. patent application Ser. No. 14/041,191, filed 30 Sep. 2013, the contents and teachings of which are hereby incorporated by reference in their entirety.

As further shown in FIG. 1, the cache 160 is represented in the IO stack 140 to provide fast access to pages of provisioned storage extents 156(1) and 156(2) that have been promoted to the cache 160. In an example, the cache 160 is a logical structure backed by flash drives or other high-speed media provided in the storage 180. The flash drives can provide much faster access to data than can magnetic media from which the storage extents are generally provided, thus allowing the cache 160 to improve overall system performance. In some examples, the flash drives that compose the cache may themselves be organized in a RAID arrangement.

The cache manager 162 manages the cache 160. In an example, the volume manager 152 exposes an API (application programmer interface) and the cache manager 162 consumes the API to obtain information about provisioned extents 156(1) and 156(2). In an example, the cache manager 162 operates a policy to promote frequently used data from the storage extents 156(1) and 156(2) to the cache 160, and to evict data from the cache 160. The cache manager 162 also stores and manages metadata for facilitating operation of the cache 160 and for responding to cache failures.

In example operation, the data storage system 116 receives IO requests 112(1) to 112(N) from hosts 110(1) to 110(N) to effect read and/or write operations on data objects hosted by the data storage system 116, such as vLUN1, vLUN2, HFS, and vVol. The IO requests 112(1) to 112(N) arrive at the communication interface(s) 122 and propagate to the IO stack 140. The IO stack 140 internally expresses IO requests 112(1) to 112(N) as block-based requests that specify offset ranges within specified internal volumes (FLUs). As each IO request is processed, the cache manager 162 checks whether the cache 160 stores the specified pages. If so, the data storage system 116 completes the designated read or write operation by accessing the version of data stored in cache 160. If not, the data storage system 116 completes the specified operation by accessing the version of data stored on "disk," i.e., from the extents 156(1) and 156(2) backed by magnetic disks or other slower media. When the cache manager 162 changes a page in cache 160, the cache manager 162 marks the changed page as dirty. Only once the changed page in cache 160 is written back to disk does the cache manager 162 mark the page in cache 160 as clean.

As the data storage system 116 continues to operate, the cache 160 may encounter a failure. For example, a flash drive or other component that supports the cache 160 may break. If the devices supporting the cache 160 are themselves arranged in RAID groups, then multiple faults may have to occur at the same time for the cache 160 to fail. If the failed cache 160 stores pages that are marked as dirty at the time of the failure, then the most recent versions of data for those pages resides in the cache 160 and not on underlying disk. Because the cache 160 is broken, however, the data storage system 116 cannot obtain the most recent version of data for the dirty cache pages.

To prevent data corruption and to avoid confusing hosts, the cache manager 162 interrogates persistent metadata structures to identify any virtual LUNs for which the cache 160 stores dirty pages at the time of the failure. The cache manager 162 then notifies other portions of the data storage system 116 to take the identified virtual LUNs offline. If the virtual LUNs support other data objects, such as a host file system or vVol, then the data storage system 116 takes those other data objects offline. Such virtual LUNs and any data objects they support may remain offline until data can be recovered or restored.

Figure 2:
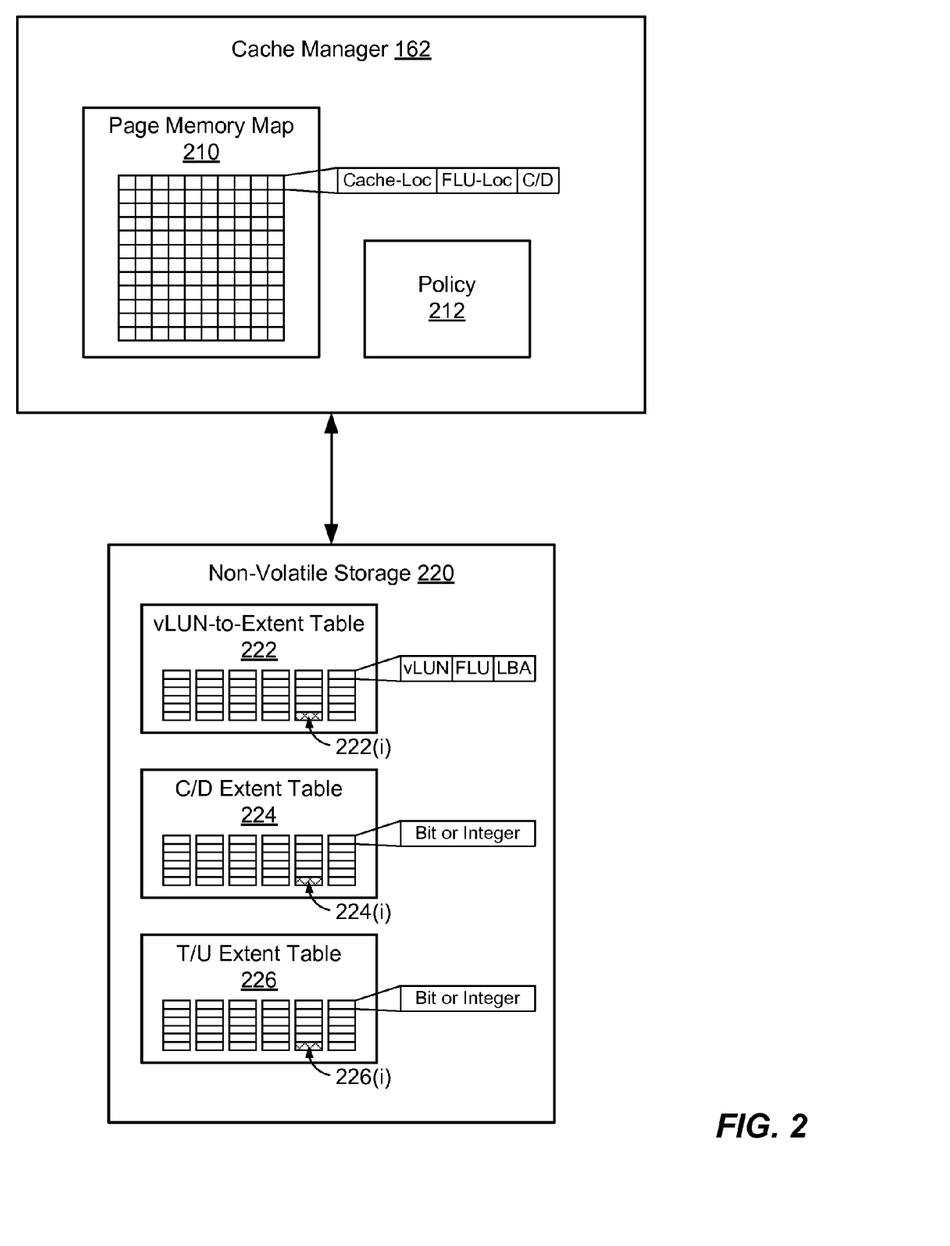
FIG. 2 is a block diagram of an example cache manager of FIG. 1.

FIG. 2 shows aspects of the cache manager 162 in additional detail. Here, it is seen that the cache manager 162 includes a page memory map 210 and a policy 212. The cache manager 162 also has access to non-volatile storage 220, which stores persistent metadata structures. The cache manager 162 has access to these metadata structures even after a failure the in the cache 160. The persistent metadata structures include a vLUN-to-extent table 222, a C/D (Clean/Dirty) extent table 224, and a T/U (Tarnished/Untarnished) extent table 226. In some examples, the data storage system 116 realizes the non-volatile storage 220 in the storage 180, such as in the same storage devices that back the cache 160 or in other devices. In some examples, the data storage system 116 stores the metadata structures 222, 224, and 226 redundantly in multiple locations, e.g., to provide a high level of fault tolerance.

In normal operation, the policy 212 promotes selected pages from disk (i.e., from storage extents 156(1) and 156(2)) into the cache 160 by directing the cache manager 162 to copy the pages from slower media supporting the extents 156(1) and 156(2) to faster media supporting the cache 160, such as flash drives in the storage 180. The policy 212 may promote pages to the cache 160 based on their frequency of use, their recency of use, and/or other factors or combinations of factors. The policy 212 may also evict pages from the cache 160, for example, if the pages are seldom accessed by hosts or have not been accessed in a long time.

The page memory map 210 maintains a cross-reference (address translation) between page locations in the cache 160 (Cache-Loc) and corresponding page locations on disk (FLU-Loc). The page memory map 210 may also store, for each page in the cache 160, a clean/dirty (C/D) bit to indicate whether the page is clean or dirty. The page memory map 210 thus stores page information at page-level granularity, i.e., with a respective entry provided for each page. In some examples, the mere presence of an entry for a page in the page memory map 210 signifies that the page is stored in the cache 160. In other examples, a separate bit (not shown) may be provided to indicate whether the page is present in cache 160 or not. In some examples, the data storage system 116 stores the page memory map 210 in volatile memory, such as RAM within the memory 130, and supports cache functionality while the cache 160 is online.

The vLUN-to-extent table 222, C/D extent table 224, and T/U extent table 226 are preferably provided at extent (e.g., slice) level granularity. Alternatively, the tables 222, 224, and 226 may be arranged with coarser granularity, such as virtual-LUN-level granularity, or with finer granularity, such as page-level granularity. It has been observed, however, that extent-level granularity provides a good balance between storage utilization and operational efficiency.

The vLUN-to-extent table 222 provides a cross-reference between virtual LUNs and storage extents. In an example, the cache manager 162 populates entries in the vLUN-to-extent table 222 in response to the volume manager 152

(FIG. 1) provisioning a storage extent (e.g., slice) from an internal volume (e.g., FLU1 or FLU2) to a vLUN. Thus, for example, each entry in the vLUN-to-extent table 222 includes a vLUN identifier, which identifies the particular vLUN to which the storage extent has been provisioned, as well as identifying information for the storage extent itself. This identifying information includes, for example, the internal volume (FLU) from which the extent was provisioned and the LBA (logical block address) of the extent within the internal volume. It should be noted that the presence of an entry for a provisioned extent in the vLUN-to-extent table 222 does not necessarily mean that the cache 160 stores any pages from the provisioned extent. Further, the vLUN-to-extent table 222 need not be directly involved in on-line operations of the cache 160. Rather, the vLUN-to-extent table 222 provides a persistent reference for associating provisioned storage extents with respective virtual LUNs, which the cache manager 162 may use in the event of a system failure, such as a failure in the cache 160.

The C/D extent table 224 stores clean/dirty cache state information at extent-level granularity. Thus, for example, if the cache manager 162 has marked any cache page backed by a given extent as dirty, then an entry for that extent in the C/D extent table 224 will likewise be marked as dirty. In some examples, the C/D extent table 224 is provided in the form of a bitmap in which a single bit represents the clean/dirty state of each extent. If a dirty cache state is represented by a logical "1," then the cache manager 162 computes each entry in the C/D extent table 224 as a logical-OR of the C/D state of each cache page backed by that extent. In other examples, the C/D extent table 224 is provided as an integer map, e.g., with each entry storing an integer count of all dirty pages supported by each provisioned extent.

The T/U extent table 226 stores tarnished/untarnished cache state information at extent-level granularity. Thus, for example, an entry for an extent in the T/U extent table 226 may be marked as tarnished if any of the pages backed by that extent have been marked as tarnished. As is known, a cache page is considered "tarnished" if its content cannot be relied upon as valid, for example, when a more recent version of data stored in the cache page may be found on disk. In an example, the cache manager 162 persistently stores the T/U extent table 226 so that it can identify tarnished pages even after a power failure or other disruptive event. Like the C/D extent table 224, the T/U extent table 226 may be provided in the form of a bitmap or an integer map, for example.

In some arrangements, entries in each of the tables 222, 224, and 226 are arranged according to an index, with entries having the same index storing data corresponding to the same provisioned storage extent. Thus, for example, entry 222(i) in the vLUN-to-extent table 222 refers to the same storage extent as do entry 224(i) in the C/D extent table and entry 226(i) in the T/U extent table. Also, those skilled in the art will recognize that the contents of the vLUN-to-extent table 222, C/D extent table 224, and T/U extent table 226 may be organized using a variety of data structures, including a single data structure, and that the three tables shown merely provide an illustrative example.

FIGS. 3-6 illustrate various processes that may be carried out in connection with the data storage system 116. These processes are typically performed by the software constructs described in connection with FIGS. 1 and 2, which reside in the memory 130 of the storage processor 120 and are run by the set of processing units 124. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

Figure 3:
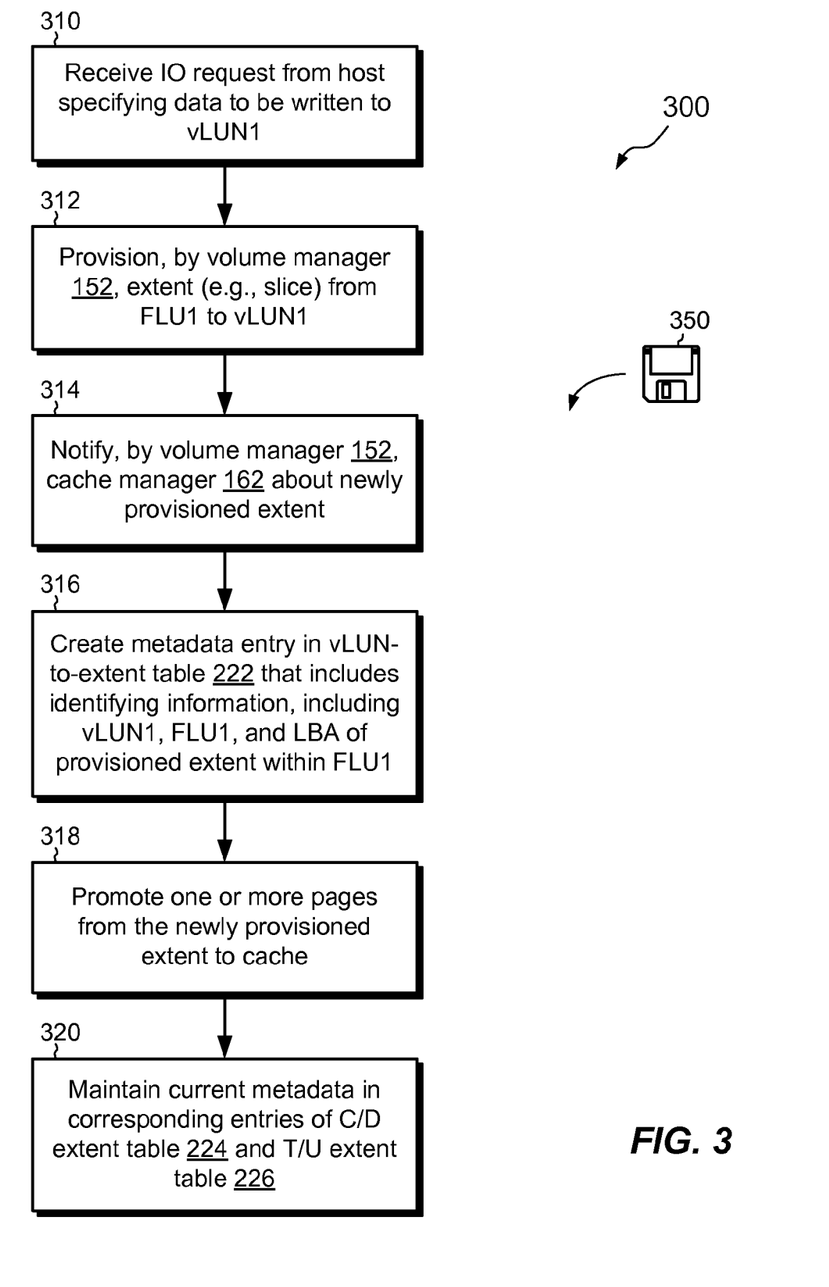
FIG. 3 is a flowchart showing an example process for creating metadata that associates multiple data objects with respective ranges of cache pages.

FIG. 3 shows an example process 300 for populating the persistent metadata structures 222, 224, and 226. The process 300 may be carried out, for example, in response to IO requests specifying data to be written to a designated thin data object, which causes the volume manager 152 to provision additional storage to the designated object to satisfy the IO requests.

At 310, the data storage system 116 receives an IO request (e.g., one of 112(1) to 112(N)) from a host (e.g., one of the hosts 110(1) to 110(N)). The IO request specifies data to be written to a designated data object, i.e., vLUN1 in this example.

At 312, and in response to receiving the IO request, the volume manager 152 provisions a free storage extent (e.g., a slice) from an internal volume (i.e., FLU1 in this case) to the designated data object, vLUN1.

At 314, the volume manager 152 notifies the cache manager 162 about the newly provisioned extent. For example, the volume manager 152 provides the cache manager 162 with the identity of the data object (vLUN1), as well as identifying information describing the provisioned extent, such as the internal volume (FLU1) from which the extent was provisioned and the LBA of the extent within the internal volume.

At 316, the cache manager 162 creates a metadata entry in the vLUN-to-extent table 222 that includes the information received at 314, i.e., an identifier for vLUN1, an identifier for FLU1, and the LBA of the newly provisioned extent.

At 318, the cache manager 162 promotes one or more pages from the newly provisioned extent into the cache 160. The cache manager 162 updates the page memory map 210 to reflect each newly promoted page, and the cache manager 162 proceeds to perform read and/or write operations on the promoted pages. If the cache manager 162 overwrites one of these pages in cache 160, the cache manager 162 marks the page as dirty in the page memory map 210. In the background, the cache manager 162 may operate to sync the dirty pages back to disk, changing the C/D states of the dirty pages back to clean as it proceeds.

At 320, the cache manager 162 operates to maintain current metadata in the C/D extent table 224 and in the T/U extent table 226. For example, each time the cache manager 162 marks a page backed by the newly provisioned extent as dirty, the cache manager 162 marks the respective entry for the newly provisioned extent as dirty in the C/D extent table 224. If the C/D extent table 224 provides an integer map, the cache manager 162 may increment the integer value for that entry each time a page backed by the extent is marked as dirty. Likewise, each time the cache manager 162 syncs a page back to disk, the cache manager 162 may mark the respective entry in the C/D segment table 224 as clean (assuming no other pages are dirty), or it may decrement the integer value stored for that extent in the C/D extent table 224. In an example, the cache manager 162 maintains the T/U extent table 226 in a similar way, marking and unmarking bits for the newly provisioned extent, or incrementing and decrementing integer counts in response to pages backed by the newly provisioned extent becoming tarnished or becoming untarnished.

Figure 4:
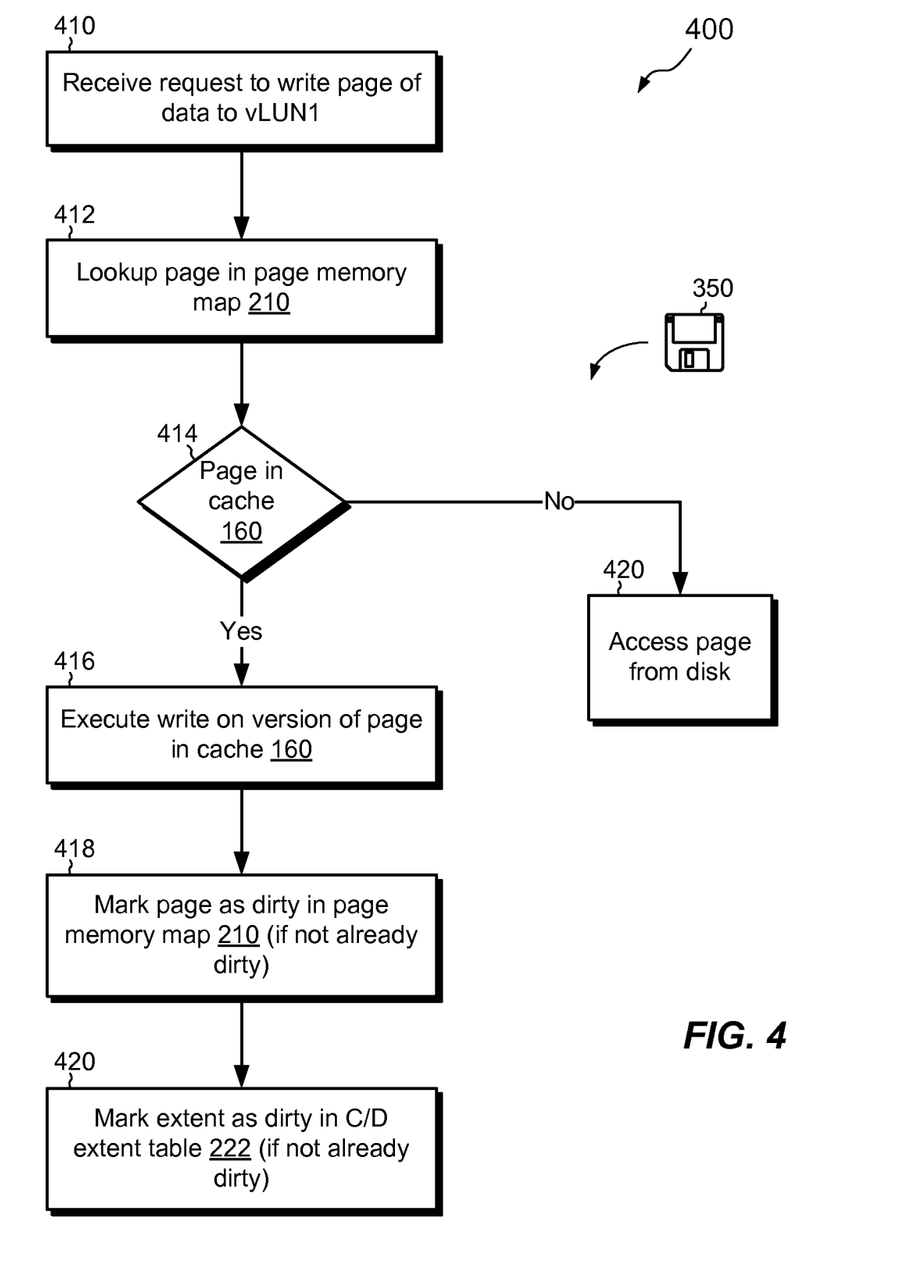
FIG. 4 is a flowchart showing an example process for processing a data write in a data storage system of FIG. 1.

FIG. 4 shows an example process 400 for processing a write request to a virtual LUN. The process 400 illustrates how the cache 160 can be operated in its online state to respond to IO requests.

At 410, the data storage system 116 receives an IO request (e.g., one of 112(1) to 112(N)) to write a page of data to a specified data object, designated here as vLUN1.

At 412, the cache manager 162 looks up the page specified in the received IO request in the page memory map 210. For example, the IO stack 140 expresses the requested page location with an identifier of its internal LUN (e.g., FLU1) and a specified offset range within the internal LUN. The cache manager 162 checks the page memory map 210 to determine whether it contains an entry for the specified page (act 414). If the requested page is not in the cache 160, processing continues to act 420, whereupon the data storage system accesses the requested page from disk.

If the requested page has been stored in the cache 160, however, operation proceeds to 416, whereupon the cache manager 162 executes the requested write operation on the version of the page in cache 160.

At 418, the cache manager 162 marks the newly written-to page as dirty in the page memory map 210 (assuming it has not already been marked dirty).

At 420, the cache manager 162 marks the extent that backs the newly written-to page as dirty, e.g., by setting a bit value for the extent in a bitmap of the C/D extent table 224, or by incrementing an integer that counts the number of dirty pages in the extent.

Figure 5:
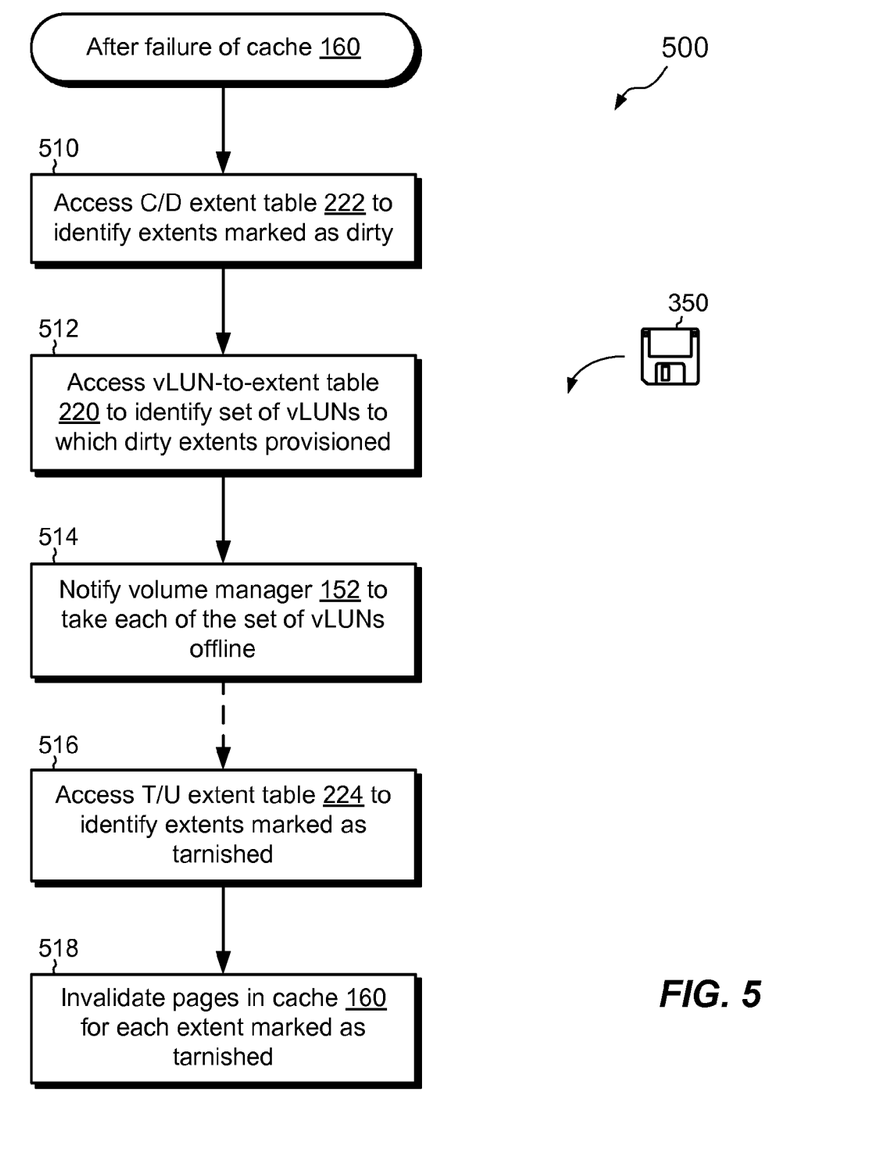
FIG. 5 is a flowchart showing an example process for responding to a failure of a cache as shown in FIG. 1.

FIG. 5 shows an example process 500 for responding to a failure in the cache 160. The process 500 may be performed, for example, in response to a flash drive, cable, or other hardware or software that supports the cache 160 becoming inoperative.

At 510, the cache manager 162 accesses the C/D extent table 224 to identify any extents in the table that have been marked as dirty. In one example, the cache manager 162 checks a bitmap for any extents marked as dirty. In another example, the cache manager 162 checks an integer map for any extents having an integer value greater than zero.

At 512, the cache manager 162 accesses the vLUN-to-extent table 222 to identify a set of virtual LUNs to which the extents found to be dirty at 510 have been provisioned. For example, for each extent marked as dirty in an entry of the C/D extent table 224, the cache manager 162 checks the corresponding entry in the vLUN-to-extent table 222, e.g., at the same index. The cache manager 162 then obtains the corresponding vLUN identifier stored in the entry of the vLUN-to-extent table 222 and adds the identified vLUN to the set of vLUNs to be taken offline.

At 514, the cache manager 162 notifies the volume manager 152 to take each of the vLUNs identified at act 512 in the set of vLUNs offline. Each of the set of vLUNs is then taken offline and made unavailable to hosts. If any of the set of vLUNs support host file systems or vVols, the supported host file systems or vVols are also taken offline.

Asynchronously with the acts described above and at any time after a failure of the cache 160, the cache manager 162 accesses the T/U extent table 224 to identify any extents marked as tarnished (516). For each tarnished extent, the cache manager 162 invalidates pages in cache 160 that store content corresponding to the tarnished extent (518), thereby ensuring that the pages in cache 160 are not relied upon to provide the most recent version of data.

Figure 6:
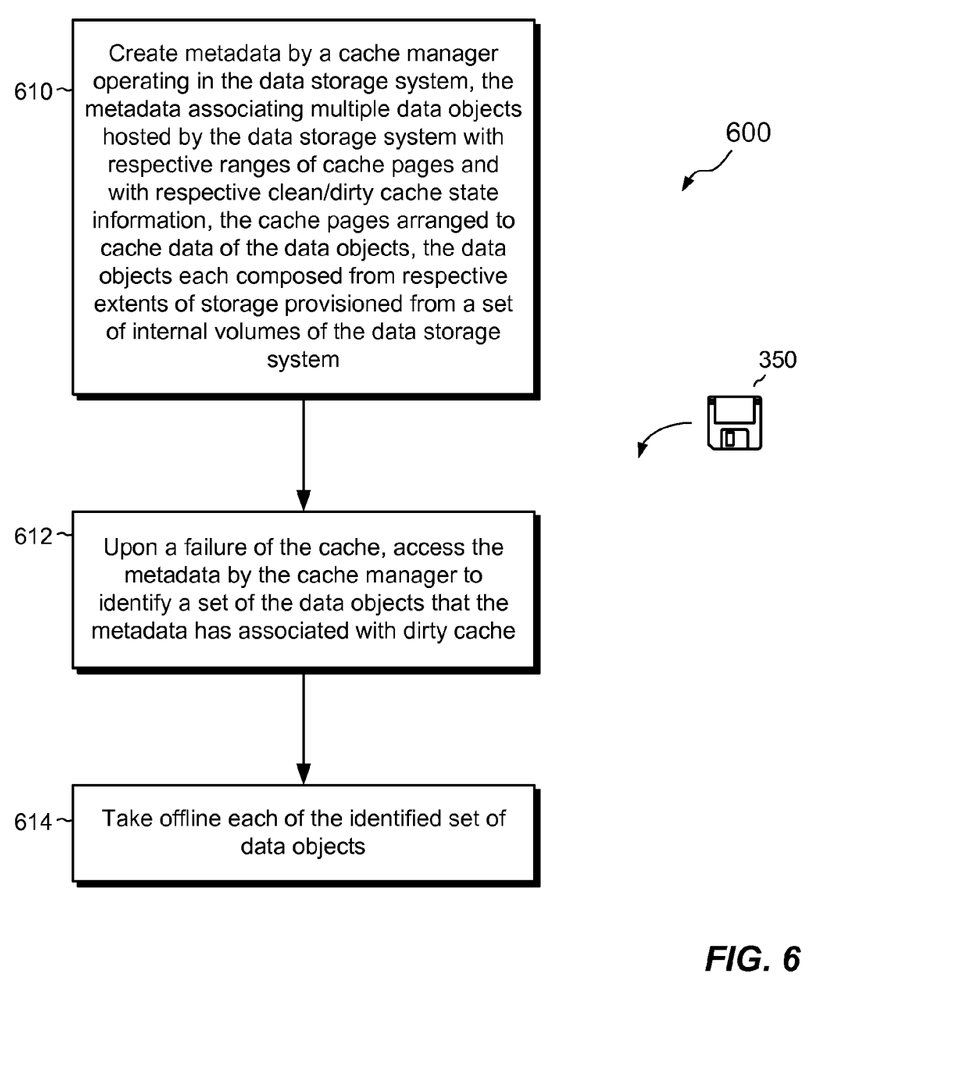
FIG. 6 is a flowchart showing an example process for managing a cache in the data storage system of FIG. 1.

FIG. 6 shows an example process 600 for managing a cache in a data storage system. The process 600 provides a summary of aspects of the improved technique described above.

At 610, metadata (e.g., 222, 224, and 226) are created by a cache manager 162 operating in the data storage system 116. The metadata associate multiple data objects (e.g., vLUN1 to vLUN4, as well as HFS and vVol) hosted by the data storage system 116 with respective ranges of cache pages (e.g., pages caching provisioned extents tracked by the vLUN-to-extent table 222) and with respective clean/dirty cache state information, such as that provided in the C/D extent table 224. The cache pages are arranged to cache data of the data objects, and the data objects each composed from respective extents (e.g., 156(1), 156(2)) of storage provisioned from a set of internal volumes (e.g., FLU1, FLU2) of the data storage system 116.

At 612, upon a failure of the cache, the metadata are accessed by the cache manager 162 to identify a set of the data objects that the metadata has associated with dirty cache, such as the set of data objects identified at act 512 in FIG. 5.

At 614, each of the identified set of data objects is taken offline. For example, the data storage system 116 takes each data object identified at act 512 offline.

An improved technique has been described for managing a cache 160 in a data storage system 116. The technique includes creating metadata (e.g., 222, 224, and 226) that associates cache pages with respective data objects (e.g., vLUN1-4, HFS, and vVol) and storing the metadata in a location 220 accessible to a manager 162 of the cache 160. Upon a failure in the cache 160, the cache manager 162 checks the metadata (e.g., 222, 224) to identify any data objects for which the cache stores dirty pages. The cache manager 162 then coordinates with other system resources to take the identified data objects offline. The scope of data objects taken offline is thus reduced from all data objects backed by an internal volume to only those data objects that have dirty pages in the failed cache. Data availability is greatly improved, with fewer users affected by a cache failure and with those users who are affected being affected to a lesser degree.

Having described certain embodiments, numerous alternative embodiments or variations can be made. For example, embodiments have been shown and described in which the cache 160 is operated as a single unit. Other embodiments may be constructed, however, in which the cache 160 is provided in distinct segments. In such arrangements, a failure in one cache segment may be contained such that only the data objects supported by the failing cache segment that contain dirty data are taken offline. Data objects supported by other cache segments may remain online, even though they may contain dirty pages, as long as such data objects are not also supported by the failing segment.

Also, it has been described that entire data objects are taken offline if the cache 160 fails while storing dirty pages for those data objects. However, this is merely an example. Although taking entire data objects offline prevents corruption and confusion, some hosts and applications may be able to cope with data objects that are partially unavailable. Thus, for example, rather than taking entire data objects offline, it may be possible to leave the objects online but to restrict access to only those portions of the objects for which there is no dirty data in cache 160.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 350 in FIGS. 3-6). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing a cache in a data storage system, the method comprising:
    creating metadata by a cache manager operating in the data storage system, the metadata associating multiple data objects hosted by the data storage system with (i) identifying information for extents of storage that back the respective data objects in the data storage system, (ii) respective ranges of cache pages that cache data of the respective data objects, and (iii) respective clean/dirty cache state information, the extents of storage provisioned from a set of internal volumes of the data storage system, each extent providing a logical range of multiple storage blocks from an internal volume, the clean/dirty state information provided at per-extent granularity and indicating, for each extent, whether any cache page backed by the extent is dirty, each of one or more of the data objects composed of storage extents provisioned from multiple internal volumes in a one-to-many manner wherein each such data object is supported by storage extents from multiple internal volumes, each of one or more of the internal volumes having storage extents provisioned to multiple data objects in a one-to-many manner wherein each such internal volume supplies storage extents to multiple data objects;
    upon a failure of the cache, accessing the metadata by the cache manager to identify, from the clean/dirty cache state information, a set of the data objects for which the clean/dirty cache state information identifies at least one dirty extent; and
    taking offline each of the identified set of data objects, each of the identified set of data objects taken offline composed of storage extents provisioned from greater than one of the set of internal volumes.

2. The method of claim 1, wherein creating the metadata includes storing, in non-volatile memory accessible to the cache manager, the identifying information for each storage extent that backs the respective data objects.

3. The method of claim 2, wherein storing the identifying information for each storage extent is performed in response to the data storage system provisioning the respective storage extent to one of the multiple data objects.

4. The method of claim 3, wherein each of the set of internal volumes is formed from a RAID group (group formed from a Redundant Array of Independent Disks) in the data storage system.

5. The method of claim 1, wherein storing the identifying information for each storage extent includes (i) storing an identifier of the internal volume from which the extent was provisioned and (ii) storing an LBA range (range of Logical Block Addresses) of the storage extent within the respective internal volume.

6. The method of claim 5, wherein the data storage system represents each of the data objects in the form of a virtual LUN (Logical Unit Number), and wherein storing the identifying information for each storage extent includes storing an identifier of the virtual LUN to which the extent was provisioned in connection with the identifier of the internal volume and the LBA range of the storage extent within the internal volume.

7. The method of claim 6, wherein the method further comprises loading pages into the cache from a group of storage extents that have already been provisioned to the data objects, and wherein creating the metadata further comprises storing, in the non-volatile memory accessible to the cache manager, a clean/dirty entry for each of the group of storage extents.

8. The method of claim 7, wherein creating the metadata further comprises storing, in the non-volatile memory accessible to the cache manager, a tarnished/untarnished entry for each of the group of storage extents.

9. The method of claim 8, further comprising creating a page memory map, the page memory map organized on a per-cache-page basis and mapping each cache page to a corresponding location in one of the group of storage extents.

10. The method of claim 9, wherein accessing the metadata by the cache manager to identify the set of data objects includes identifying the virtual LUN associated with each storage extent for which the corresponding clean/dirty entry is marked as dirty.

11. The method of claim 9, wherein the method further comprises, after the cache has been repaired following the failure of the cache, the cache manager accessing the metadata to identify each of the group of storage extents for which the corresponding tarnished/untarnished entry was marked as tarnished, and invalidating all cache pages from each storage extent marked as tarnished.

12. A data storage system comprising control circuitry including a set of processing units and memory coupled to the set of processing units, the control circuitry constructed and arranged to:
    create metadata by a cache manager operating in the data storage system, the metadata associating multiple data objects hosted by the data storage system with (i) identifying information for extents of storage that back the respective data objects in the data storage system, (ii) respective ranges of cache pages that cache data of the respective data objects, and (iii) respective clean/dirty cache state information, the extents of storage provisioned from a set of internal volumes of the data storage system, each extent providing a logical range of multiple storage blocks from an internal volume, the clean/dirty state information provided at per-extent granularity and indicating, for each extent, whether any cache page backed by the extent is dirty, each of one or more of the data objects composed of storage extents provisioned from multiple internal volumes in a one-to-many manner wherein each such data object is supported by storage extents from multiple internal volumes, each of one or more of the internal volumes having storage extents provisioned to multiple data objects in a one-to-many manner wherein each such internal volume supplies storage extents to multiple data objects;

upon a failure of the cache, access the metadata by the cache manager to identify, from the clean/dirty cache state information, a set of the data objects for which the clean/dirty cache state information identifies at least one dirty extent; and take offline each of the identified set of data objects, each of the identified set of data objects taken offline composed of storage extents provisioned from greater than one of the set of internal volumes.

13. The data storage system of claim 12, wherein, when creating the metadata, the control circuitry is further constructed and arranged to store, in non-volatile memory accessible to the cache manager, the identifying information for each storage extent that backs the respective data objects.

14. The data storage system of claim 13, wherein the data storage system represents each of the data objects in the form of a virtual LUN (Logical Unit Number), and wherein, when constructed and arranged to store the identifying information for each storage extent, the control circuitry is further constructed and arranged to (i) store an identifier of the internal volume from which the extent was provisioned, (ii) store an LBA range (range of Logical Block Addresses) of the storage extent within the respective internal volume, and (iii) store an identifier of the virtual LUN to which the extent was provisioned.

15. A non-transitory, computer-readable medium including instructions which, when executed by a set of processing units of a data storage system, cause the data storage system to perform a method of managing a cache, the method comprising:

creating metadata by a cache manager operating in the data storage system, the metadata associating multiple data objects hosted by the data storage system with (i) identifying information for extents of storage that back the respective data objects in the data storage system, (ii) respective ranges of cache pages that cache data of the respective data objects, and (iii) respective clean/dirty cache state information, the extents of storage provisioned from a set of internal volumes of the data storage system, each extent providing a logical range of multiple storage blocks from an internal volume, the clean/dirty state information provided at per-extent granularity and indicating, for each extent, whether any cache page backed by the extent is dirty, each of one or more of the data objects composed of storage extents provisioned from multiple internal volumes in a one-to-many manner wherein each such data object is supported by storage extents from multiple internal volumes, each of one or more of the internal volumes having storage extents provisioned to multiple data objects in a one-to-many manner wherein each such internal volume supplies storage extents to multiple data objects;

upon a failure of the cache, accessing the metadata by the cache manager to identify, from the clean/dirty cache state information, a set of the data objects for which the clean/dirty cache state information identifies at least one dirty extent; and taking offline each of the identified set of data objects, each of the identified set of data objects taken offline composed of storage extents provisioned from greater than one of the set of internal volumes.

16. The non-transitory, computer-readable medium of claim 15, wherein creating the metadata includes storing, in non-volatile memory accessible to the cache manager, the identifying information for each storage extent that backs the respective data objects, and wherein storing the identifying information for each storage extent is performed in response to the data storage system provisioning the respective storage extent to one of the multiple data objects.

17. The non-transitory, computer-readable medium of claim 16, wherein the data storage system represents each of the data objects in the form of a virtual LUN (Logical Unit Number), and wherein storing the identifying information for each storage extent includes (i) storing an identifier of the internal volume from which the extent was provisioned, (ii) storing an LBA range (range of Logical Block Addresses) of the storage extent within the respective internal volume, and (iii) storing an identifier of the virtual LUN to which the extent was provisioned.

18. The non-transitory, computer-readable medium of claim 17, wherein the method further comprises loading pages into the cache from a group of storage extents that have already been provisioned to the data objects, and wherein creating the metadata further comprises storing, in the non-volatile memory accessible to the cache manager, a clean/dirty entry for each of the group of storage extents.

19. The non-transitory, computer-readable medium of claim 18, wherein the method further comprises creating a page memory map, the page memory map organized on a per-cache-page basis and mapping each cache page to a corresponding location in one of the group of storage extents provisioned from one of the internal volumes.

20. The non-transitory, computer-readable medium of claim 19, wherein accessing the metadata by the cache manager to identify the set of data objects includes identifying the virtual LUN associated with each storage extent for which the corresponding clean/dirty entry is marked as dirty.

21. The method of claim 1, wherein each of the multiple data objects hosted by the data storage system is made accessible by the data storage system to a set of host computing devices over a network.

22. The method of claim 21, wherein at least one of the multiple data objects hosted by the data storage system is made accessible to the set of host computing devices using one of NFS (Network File System) and CIFS (Common Internet File System).

23. The method of claim 1, wherein, when taking offline each of the identified set of data objects, data objects that the metadata has not associated with dirty cache are kept online.

* * * * *